US011396260B2

(12) United States Patent
Ohtsuka et al.

(10) Patent No.: US 11,396,260 B2
(45) Date of Patent: Jul. 26, 2022

(54) ILLUMINATION LAMP

(71) Applicant: Yazaki Corporation, Tokyo (JP)

(72) Inventors: Haruhito Ohtsuka, Shizuoka (JP); Yuta Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/207,048

(22) Filed: Mar. 19, 2021

(65) Prior Publication Data

US 2021/0291728 A1  Sep. 23, 2021

(30) Foreign Application Priority Data

Mar. 23, 2020 (JP) .............................. JP2020-051407

(51) Int. Cl.
*B60Q 3/51* (2017.01)
*F21V 23/06* (2006.01)
*B60Q 3/60* (2017.01)
*F21V 19/00* (2006.01)

(52) U.S. Cl.
CPC ............... *B60Q 3/51* (2017.02); *B60Q 3/60* (2017.02); *F21V 19/0015* (2013.01); *F21V 23/06* (2013.01)

(58) Field of Classification Search
CPC .. B60Q 3/51; B60Q 3/60; F21V 23/06; F21V 19/0015
See application file for complete search history.

(56) References Cited

U.S. PATENT DOCUMENTS

| 7,775,694 | B2* | 8/2010 | Nagai | B60Q 3/51 |
| | | | | 362/490 |
| 2005/0254250 | A1* | 11/2005 | Nagai | B60Q 3/51 |
| | | | | 362/490 |
| 2006/0006053 | A1* | 1/2006 | Nagai | B60Q 3/82 |
| | | | | 200/61.54 |
| 2009/0073707 | A1* | 3/2009 | Nagai | B60Q 3/51 |
| | | | | 362/490 |
| 2010/0195348 | A1* | 8/2010 | Ohtsuka | B60Q 3/51 |
| | | | | 362/546 |
| 2010/0208482 | A1* | 8/2010 | Ohtsuka | B60Q 3/51 |
| | | | | 362/520 |
| 2013/0279189 | A1* | 10/2013 | Suzuki | B60Q 3/51 |
| | | | | 362/549 |
| 2015/0146433 | A1* | 5/2015 | Suzuki | B60Q 3/64 |
| | | | | 362/311.01 |
| 2018/0216796 | A1* | 8/2018 | Suzuki | B60Q 3/60 |

FOREIGN PATENT DOCUMENTS

JP    2005-075219 A    3/2005
JP    2010173593 A     8/2010

* cited by examiner

*Primary Examiner* — Tsion Tumebo
(74) *Attorney, Agent, or Firm* — Sughrue Mion, PLLC

(57) ABSTRACT

An illumination lamp includes: a frame-shaped body provided with a first guide portion; and a function portion provided with a light emitting portion emitting light and a first guided portion. The first guided portion is engaged with the first guide portion in a state where the function portion is installed in the frame-shaped body, so that a change in the posture of the function portion with respect to the frame-shaped body is regulated around a predetermined axis.

9 Claims, 17 Drawing Sheets

(UPPER SIDE) ↕ HEIGHT DIRECTION (LOWER SIDE)   ↔ LATERAL DIRECTION

ILLUMINATION LAMP

CROSS-REFERENCE TO RELATED APPLICATIONS

The present application is based on, and claims priority from Japanese Patent Application No. 2020-051407, filed on Mar. 23, 2020, the entire contents of which are incorporated herein by reference.

TECHNICAL FIELD

The present invention relates to an illumination lamp.

BACKGROUND

An illumination lamp disclosed in JP 2005-75219 A includes a function portion and a design portion, and is installed in a through-hole, which is an opening of a ceiling trim to be an interior material of a vehicle.

SUMMARY

In the illumination lamp disclosed in JP 2005-75219 A, the function portion is installed in a bezel (design portion) by moving the function portion downward with respect to the bezel. In a state where the function portion is installed in the bezel, a locked portion provided in the function portion is locked to a locking portion provided in the bezel.

However, in the illumination lamp disclosed in JP 2005-75219 A, if a wiring extending from a connector installed in the function portion is pulled or the like when the lamp is attached to the vehicle, an unexpectedly large moment is applied to the function portion. By the moment, the function portion may be separated from the bezel.

An object of the present invention is to provide an illumination lamp capable of preventing a function portion from being separated from a design portion, even when an unexpectedly large moment is applied to the function portion.

An illumination lamp according to the embodiment includes: a frame-shaped body provided with a first guide portion; and a function portion provided with a light emitting portion emitting light and a first guided portion. The first guided portion is engaged with the first guide portion in a state where the function portion is installed in the frame-shaped body, so that a change in the posture of the function portion with respect to the frame-shaped body is regulated around at least a predetermined axis.

Further, in the illumination lamp according to the embodiment, the frame-shaped body includes a locking portion, and the function portion includes a locked portion. When the function portion is installed in the frame-shaped body, the locked portion is locked to the locking portion, the light emitting portion is located in the vicinity of the locking portion and the locked portion, and the first guide portion is separated from the light emitting portion.

Further, in the illumination lamp according to the embodiment, the frame-shaped body includes a contact portion. When the function portion is installed in the frame-shaped body, the function portion comes into contact with the contact portion and the locked portion is locked to the locking portion, so that the function portion is sandwiched by the locking portion of the frame-shaped body and the contact portion of the frame-shaped body, and the function portion is locked to the frame-shaped body. The contact portion is separated from the locking portion and the locked portion and the light emitting portion, in a predetermined direction orthogonal to a direction in which the function portion is sandwiched by the locking portion of the frame-shaped body and the contact portion of the frame-shaped body.

Further, the illumination lamp according to the embodiment further includes a lens integrally installed in the frame-shaped body. A function portion installation portion in which the function portion is installed is provided on the side of a first end of the frame-shaped body, a lens installation portion in which the lens is installed is provided on the side of a second end of the frame-shaped body, and a through-hole is formed due to the absence of the contact portion. In a state where the function portion is installed in the function portion installation portion of the frame-shaped body and the lens is installed in the lens installation portion of the frame-shaped body, the light emitting portion of the function portion emits light to the side of the second end, and the light emitted by the light emitting portion of the function portion readies the lens through the through-hole.

Further, in the illumination lamp according to the embodiment, the locked portion is formed of a protrusion protruding from a function portion main body provided in the function portion. The locking portion includes a first protruding portion protruding from a frame-shaped body main body provided in the frame-shaped body, a second protruding portion protruding from the first protruding portion in a direction different from a direction of the first protruding portion, and a third protruding portion protruding from the second protruding portion in a direction toward a base end of the first protruding portion. When the function portion is installed in the frame-shaped body, a tip of the third protruding portion contacts the protrusion of the locked portion.

Further, in the illumination lamp according to the embodiment, when the function portion is installed in the frame-shaped body, the first guided portion is engaged with the first guide portion, so that the function portion moves linearly with respect to the frame-shaped body, and the predetermined axis extends in another predetermined direction orthogonal to a movement direction of the function portion when the function portion is installed in the frame-shaped body.

Further, the illumination lamp according to the embodiment further includes a connector including a connector main body and a wiring extending from the connector main body. The connector main body is installed in the function portion. In a state where the function portion is installed in the frame-shaped body and the connector is installed in the function portion, even if the wiring is pulled in a predetermined direction and a rotational moment is generated in the connector main body and the function portion, a change in the posture of the function portion with respect to the frame-shaped body is regulated around the predetermined axis.

Further, in the illumination lamp according to the embodiment, the frame-shaped body is provided with a second guide portion, and the function portion is provided with a second guided portion. The second guided portion is engaged with the second guide portion in a state where the function portion is installed in the frame-shaped body, so that a change in the posture of the function portion with respect to the frame-shaped body is regulated around the at least predetermined axis.

Furthermore, an illumination lamp according to the embodiment includes: a frame-shaped body provided with a first guide portion, a second guide portion, a locking portion, a contact portion, and a through-hole formed due to the absence of the contact portion; and a function portion provided with a light emitting portion emitting light, a first guided portion, a second guided portion, and a locked portion. The first guided portion is engaged with the first guide portion and the second guided portion is engaged with the second guide portion, so that the function portion moves in a height direction with respect to the frame-shaped body and is installed in the frame-shaped body. When the function portion is installed in the frame-shaped body, the first guided portion is engaged with the first guide portion and the second guided portion is engaged with the second guide portion, so that a change in the posture of the function portion with respect to the frame-shaped body is regulated around an axis extending in a lateral direction. When the function portion is installed in the frame-shaped body, the light emitting portion and the through-hole are located in the vicinity of the locking portion and the locked portion in a longitudinal direction. The first guide portion and the first guided portion and the second guide portion and the second guided portion are separated from the locking portion, the locked portion, the light emitting portion, and the through-hole. When the function portion is installed in the frame-shaped body, the function portion comes into contact with the contact portion and the locked portion is locked to the locking portion, so that the function portion is sandwiched in the height direction by the locking portion of the frame-shaped body and the contact portion of the frame-shaped body, and the function portion is locked to the frame-shaped body. The light emitted by the light emitting portion passes through the through-hole.

According to the above configuration, it is possible to provide an illumination lamp capable of preventing a function portion from being separated from a design portion, even when an unexpectedly large moment is applied to the function portion.

DETAILED DESCRIPTION

Various embodiments will be described hereinafter with reference to the accompanying drawings.

Figure 1:
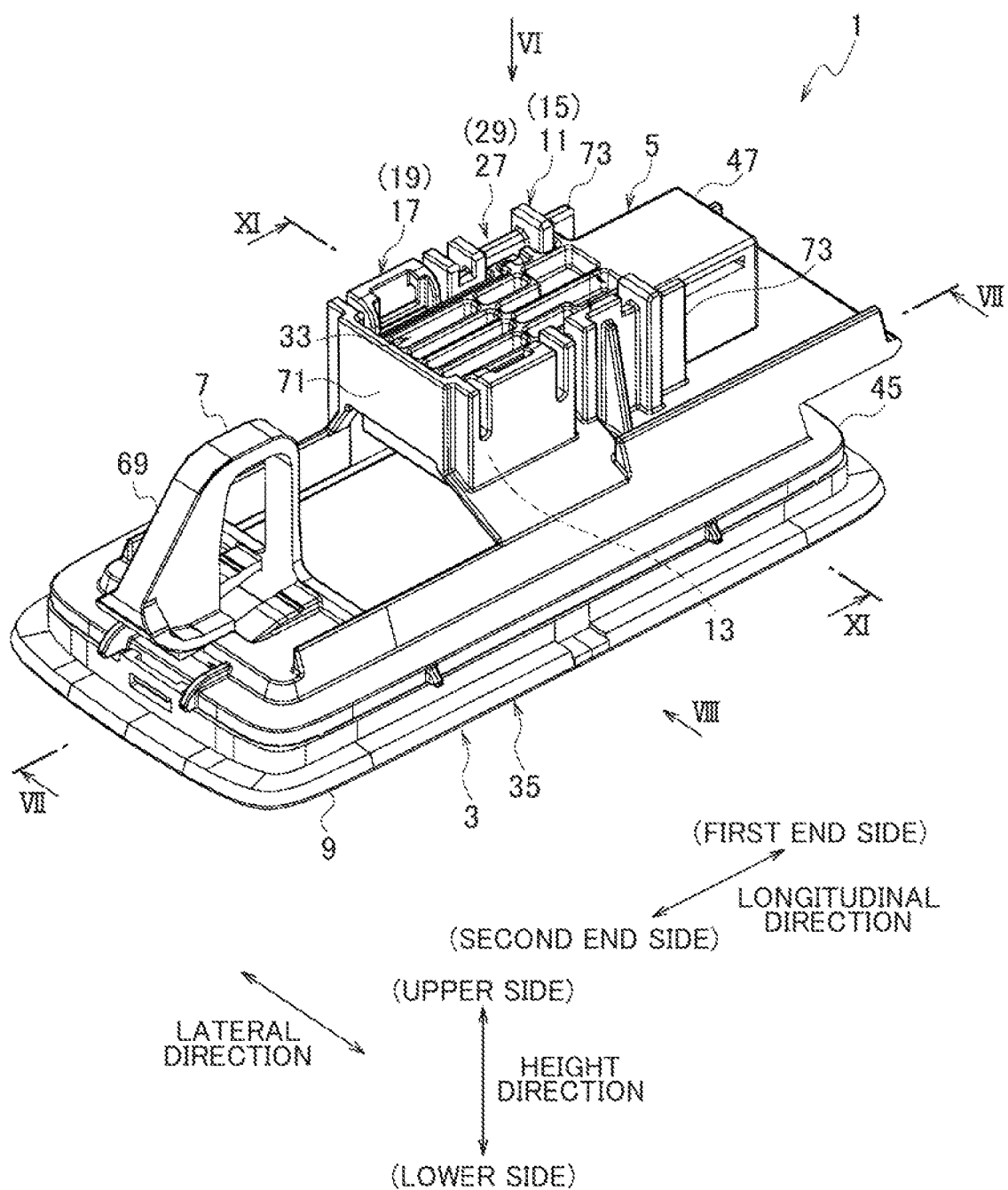
FIG. 1 is a perspective view of an illumination lamp according to an embodiment of the present invention.
Figure 2:
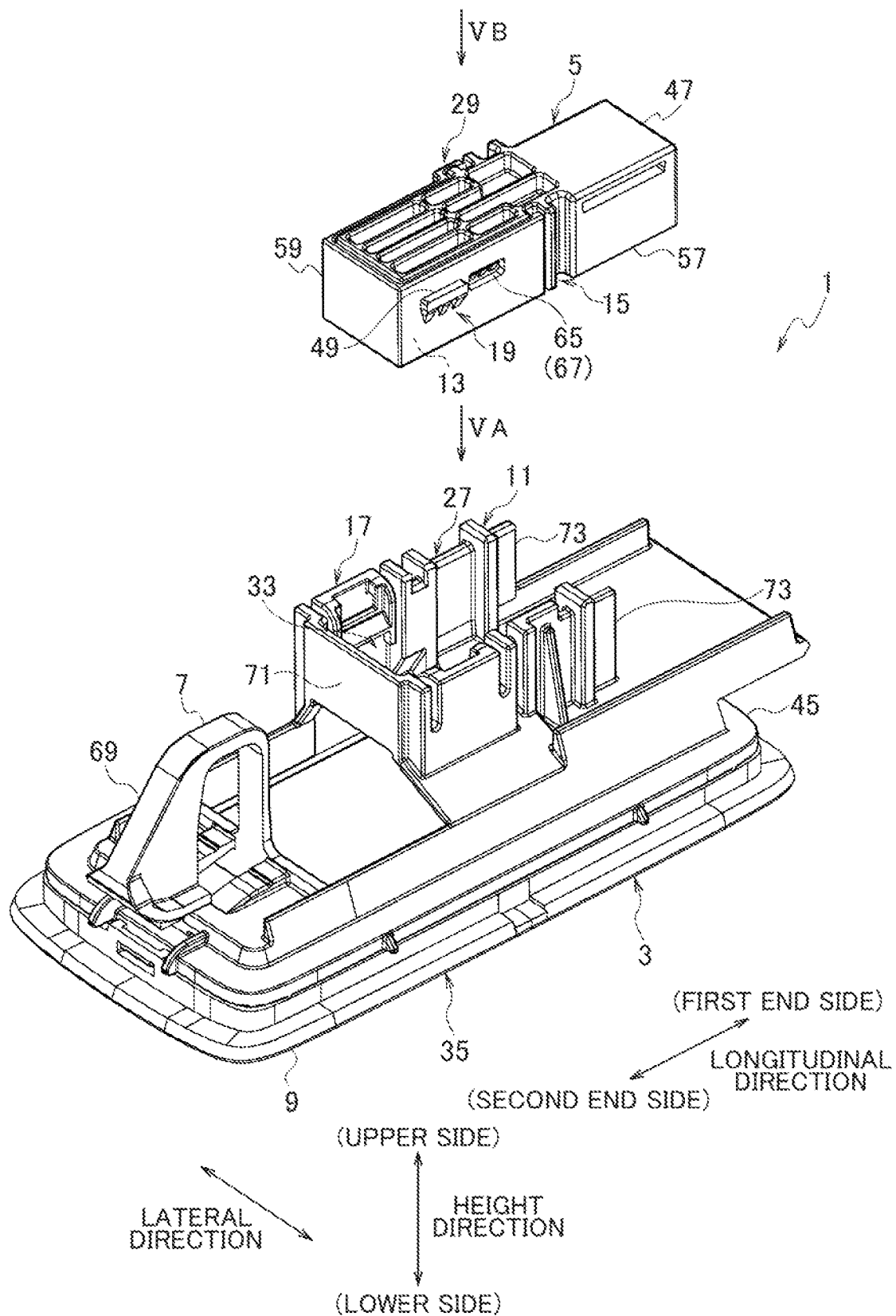
FIG. 2 is a perspective view of the illumination lamp according to the embodiment of the present invention, and illustrates a state where a function portion is removed from a design portion.
Figure 3:
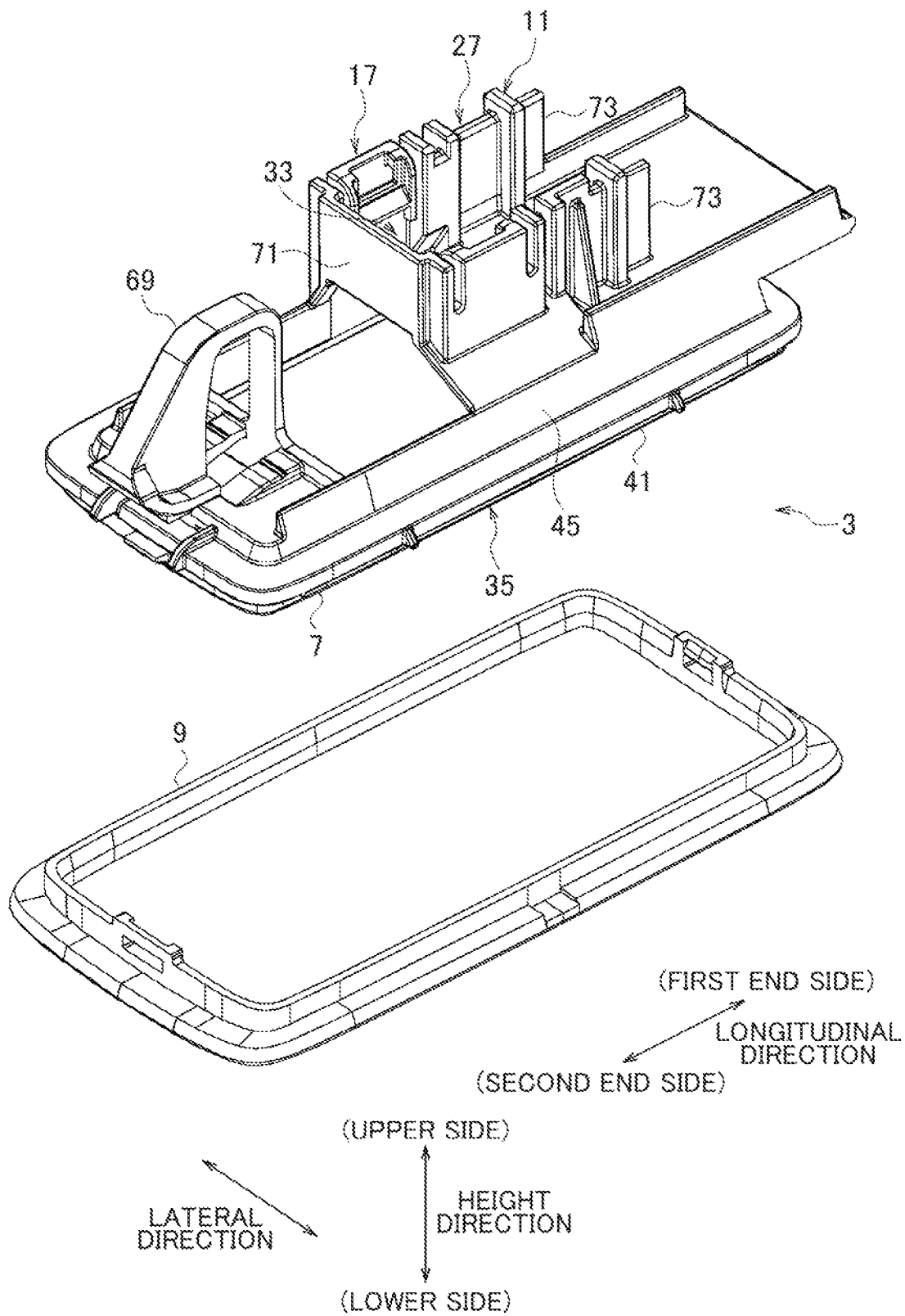
FIG. 3 is an exploded perspective view of the design portion of the illumination lamp according to the embodiment of the present invention.

An illumination lamp 1 according to an embodiment of the present invention is used as an interior light of a vehicle, for example, and as illustrated in FIGS. 1 to 3, the illumination lamp 1 is configured to include a design portion (design body) 3 and a function portion (function body) 5. The design portion 3 is configured to include a frame-shaped body (bezel) 7 and a lens (lens portion) 9. The frame-shaped body 7 is integrally molded with, for example, a synthetic resin. The lens 9 is also integrally molded with, for example, a synthetic resin.

The frame-shaped body 7 is provided with a first guide portion 11. The function portion 5 is separated from the design portion 3 (frame-shaped body 7) and is integrally installed in the frame-shaped body 7. The function portion 5 is provided with a light emitting portion 13 emitting light and a first guided portion 15.

The first guided portion 15 of the function portion 5 is engaged so as to be fitted into the first guide portion 11 of the frame-shaped body 7 when the function portion 5 is installed in the frame-shaped body 7, so that the function portion 5 is integrally installed in the frame-shaped body 7.

In a state where the function portion 5 is integrally installed in the frame-shaped body 7, the first guided portion 15 is engaged with the first guide portion 11, so that a change in the posture of the function portion 5 with respect to the frame-shaped body 7 is regulated around at least one predetermined axis.

For convenience of explanation, a predetermined direction in the illumination lamp 1 or the like is defined as a longitudinal direction, another predetermined direction orthogonal to the longitudinal direction is defined as a lateral direction, and a direction orthogonal to the longitudinal direction and the lateral direction is defined as a height direction. The height direction may be a vertical direction, but the height direction is not limited to the vertical direction.

Figure 11:
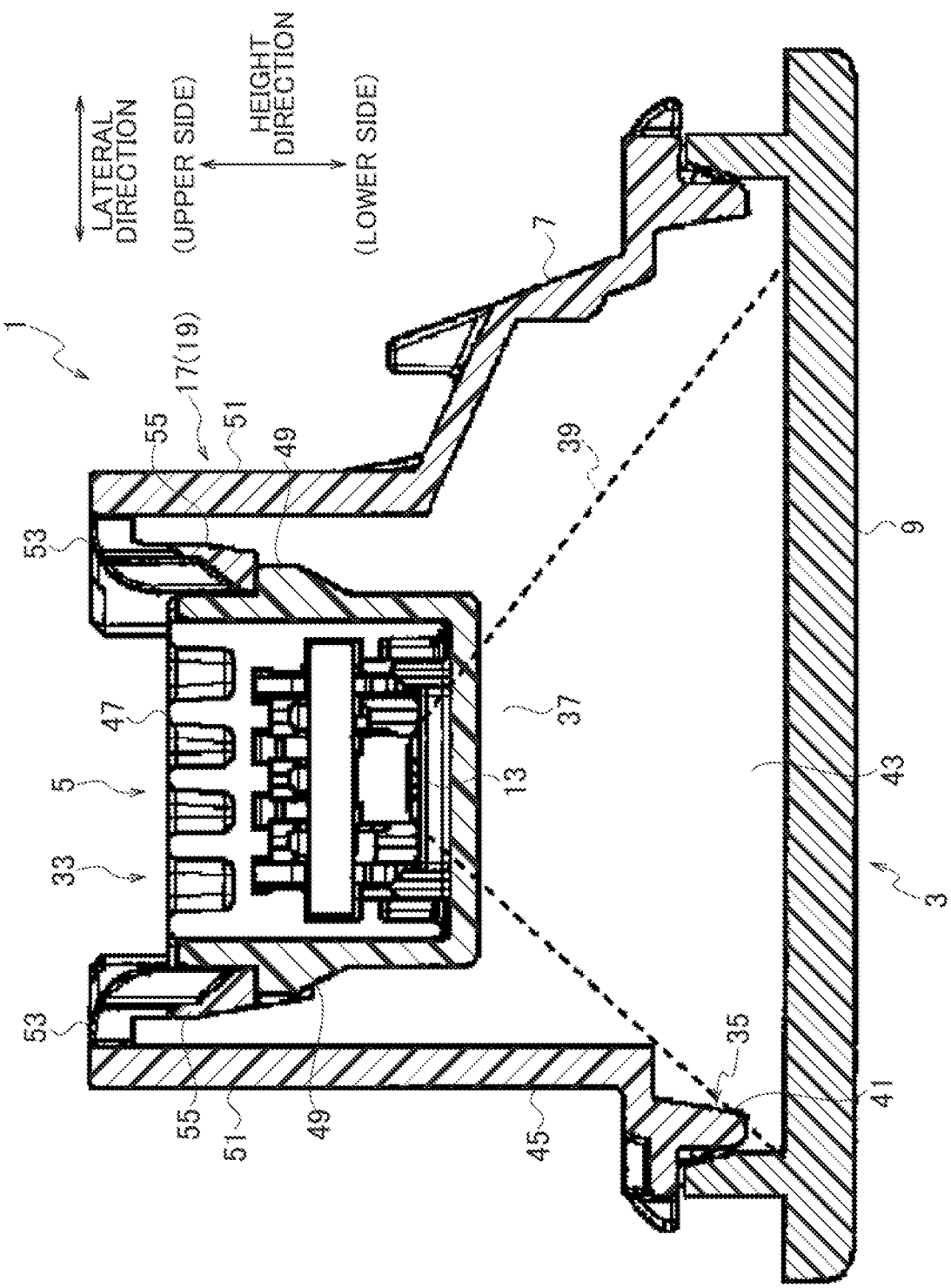
FIG. 11 is a cross-sectional view taken along the line XI-XI of FIG. 1.
Figure 13A:
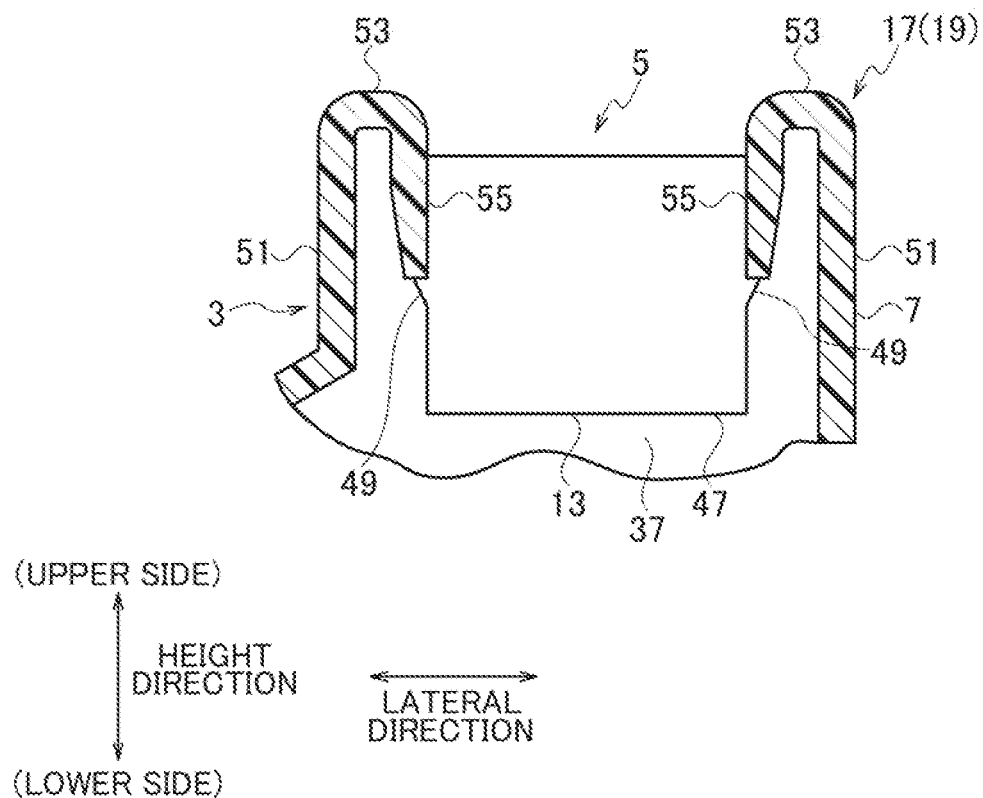
FIG. 13A is a slightly simplified view of a part of the illumination lamp according to the embodiment of the present invention, and is a cross-sectional view taken along the line XIIIA-XIIIA of FIG. 7.
Figure 13B:
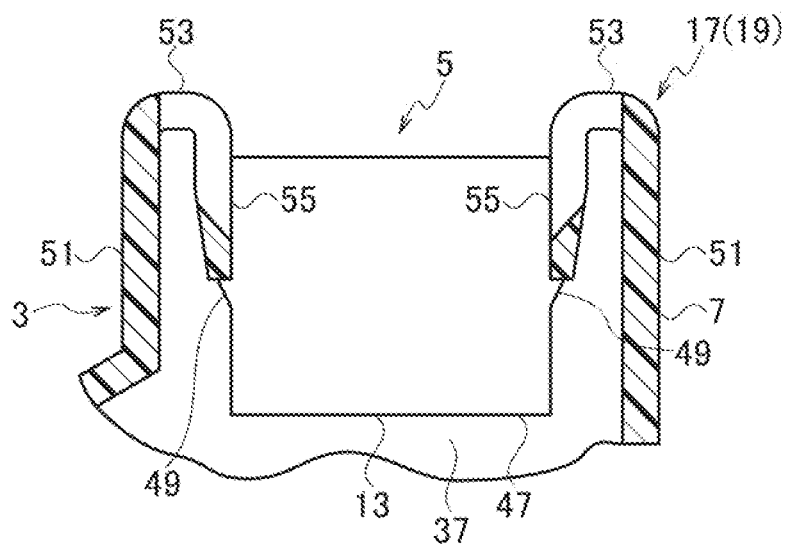
FIG. 13B is a slightly simplified view of a part of the illumination lamp according to the embodiment of the present invention, and is a cross-sectional view taken along the line XIIIB-XIIIB of FIG. 7.

As illustrated in FIGS. 11, 13A, and the like, the frame-shaped body 7 is provided with a locking portion 17, and the function portion 5 is provided with a locked portion 19. In a state where the function portion 5 is integrally installed in the frame-shaped body 7, the locked portion 19 of the function portion 5 comes in contact with the locking portion 17 of the frame-shaped body 7 and is locked.

When the function portion 5 is installed in the frame-shaped body 7, the first guided portion 15 is engaged with and guided by the first guide portion 11. The function portion 5 is configured to move linearly with respect to the frame-shaped body 7 only in the height direction.

The predetermined axis around which the change in the posture of the function portion 5 with respect to the frame-shaped body 7 is regulated in a state when the function portion 5 is installed in the frame-shaped body 7 is an axis extending in the lateral direction. The axis extending in the lateral direction is an axis extending in another predetermined direction orthogonal to a movement direction of the function portion 5 when the function portion 5 is installed in the frame-shaped body 7.

As illustrated in HG. 8, the function portion 5 is configured to be provided with a connector 21. The connector 21 includes a connector main body 23 and a wiring (for example, a cable) 25 extending from the connector main body 23. The connector main body 23 of the connector 21 is configured to be integrally installed in the function portion 5.

Figure 9:
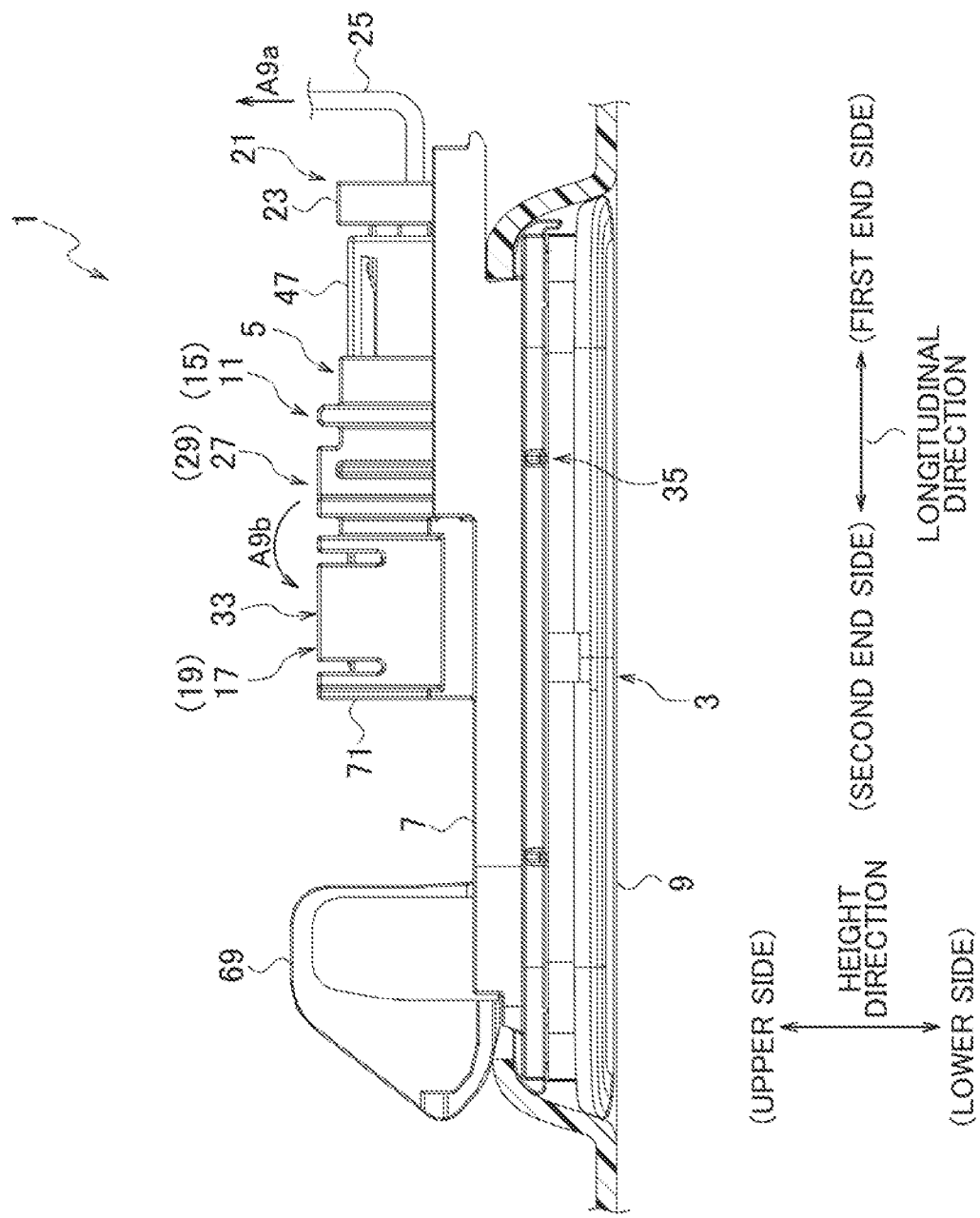
FIG. 9 is an IX arrow view in FIG. 6.
Figure 10:
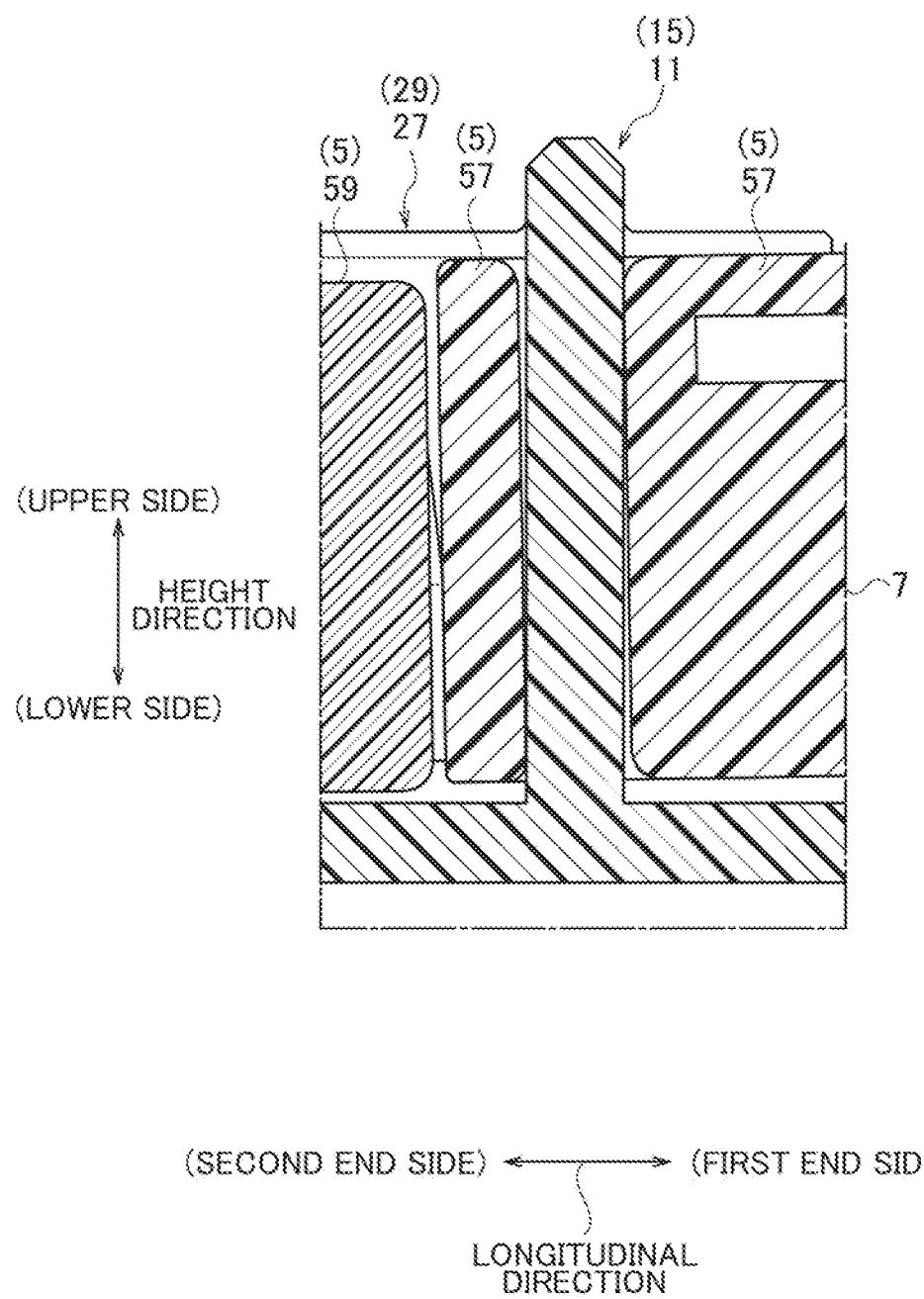
FIG. 10 is a cross-sectional view taken along the line X-X of FIG. 6.

In a state where the function portion 5 installed in the frame-shaped body 7 and the connector 21 is installed in the function portion 5, as indicated by an arrow A9a in FIG. 9, if the wiring 25 is pulled in a predetermined direction (to the upper side in a height direction), a rotational moment indicated by an arrow A9b is generated in the connector main body 23 and the function portion 5. In the illumination lamp 1, even if the rotational moment-indicated by the arrow A9b is generated, the change in the posture of the function portion 5 with respect to the frame-shaped body 7 is regulated around the axis extending in the lateral direction. That is, as illustrated in FIG. 10, the first guided portion 15 of the function portion 5 is engaged with the first guide portion 11 of the frame-shaped body 7, so that the change in the posture of the function portion 5 with respect to the frame-shaped body 7 is regulated around the axis extending in the lateral direction.

Figure 6:
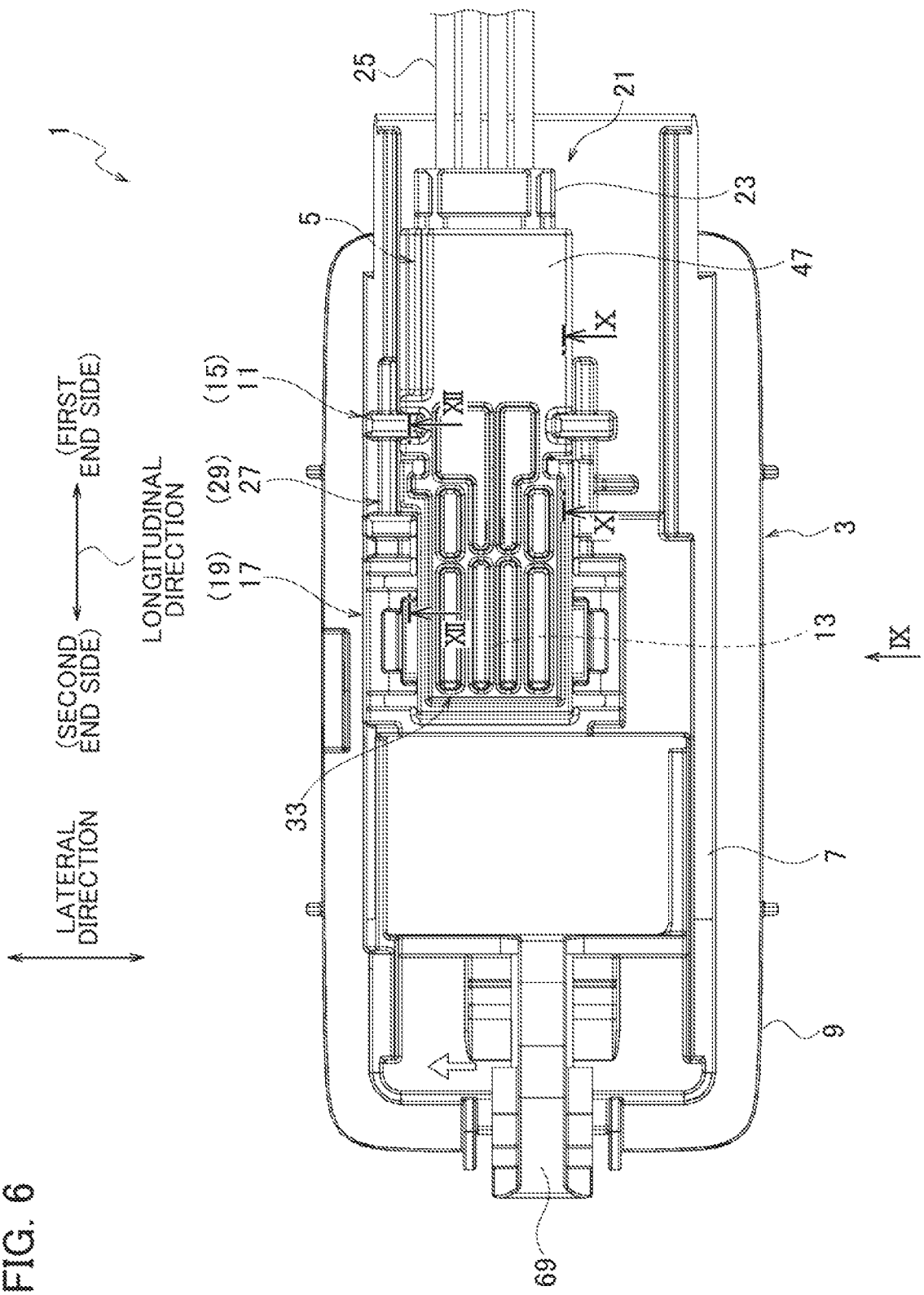
FIG. 6 is a VI arrow view in FIG. 1, and illustrates a state where a connector is installed in the function portion.
Figure 12:
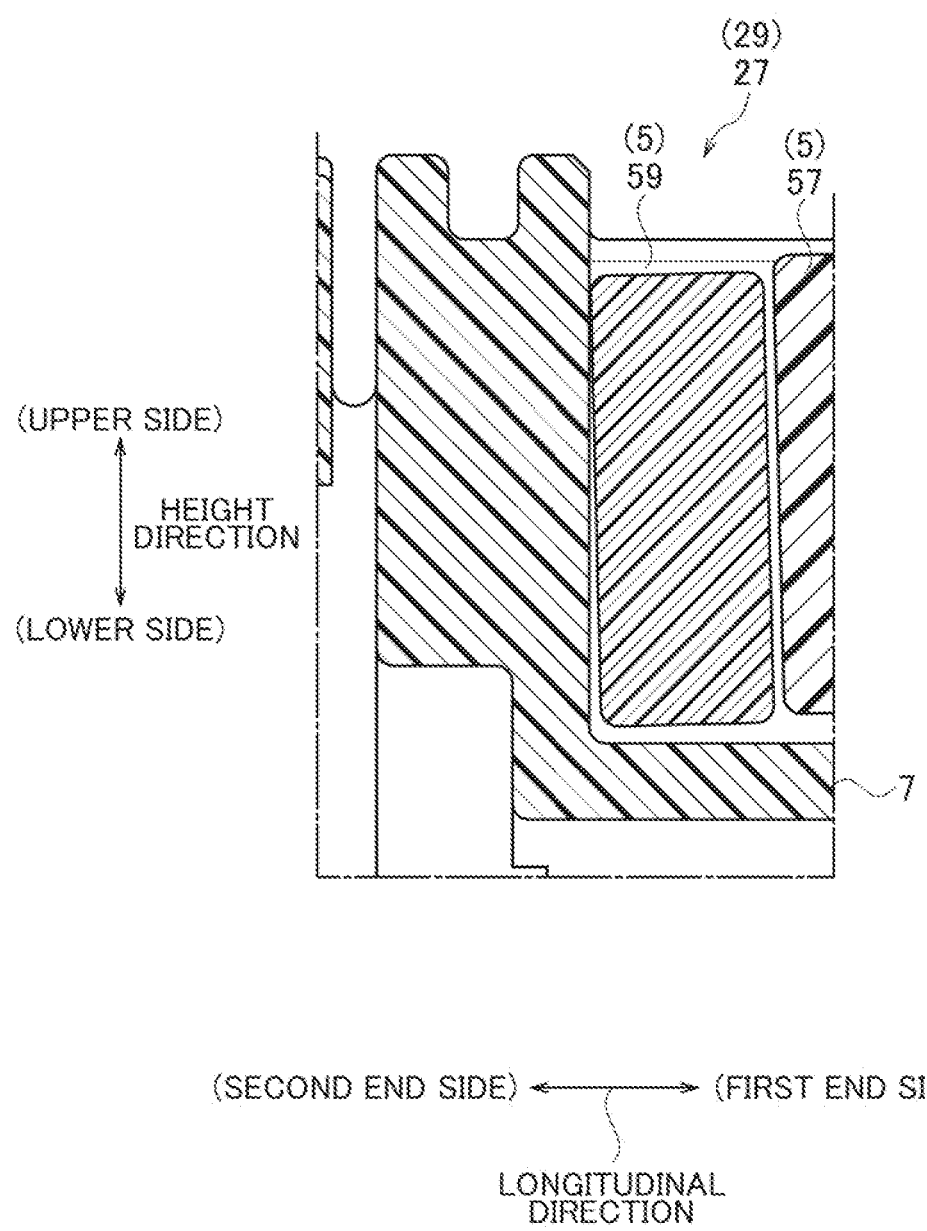
FIG. 12 is a cross-sectional view taken along the line XII-XII of FIG. 6.

As illustrated in FIGS. 6 and 12 and the like, the frame-shaped body 7 is provided with a second guide portion 27 separated from the first guide portion 11, and the function portion 5 is provided with a second guided portion 29 separated from the first guided portion 15.

In a state where the function portion 5 is installed in the frame-shaped body 7, the second guided portion 29 is engaged with the second guide portion 27. In addition, the change in the posture of the function portion 5 with respect to the frame-shaped body 7 is regulated at least around the axis extending in the lateral direction.

The second guide portion 27 and the second guided portion 29 are operated in the same manner as the first guide portion 11 and the first guided portion 15. That is, even if the second guided portion 29 is engaged with the second guide portion 27 when the function portion 5 is installed in the frame-shaped body 7, the function portion 5 moves linearly with respect to the frame-shaped body 7 only in the height direction.

Figure 5A:
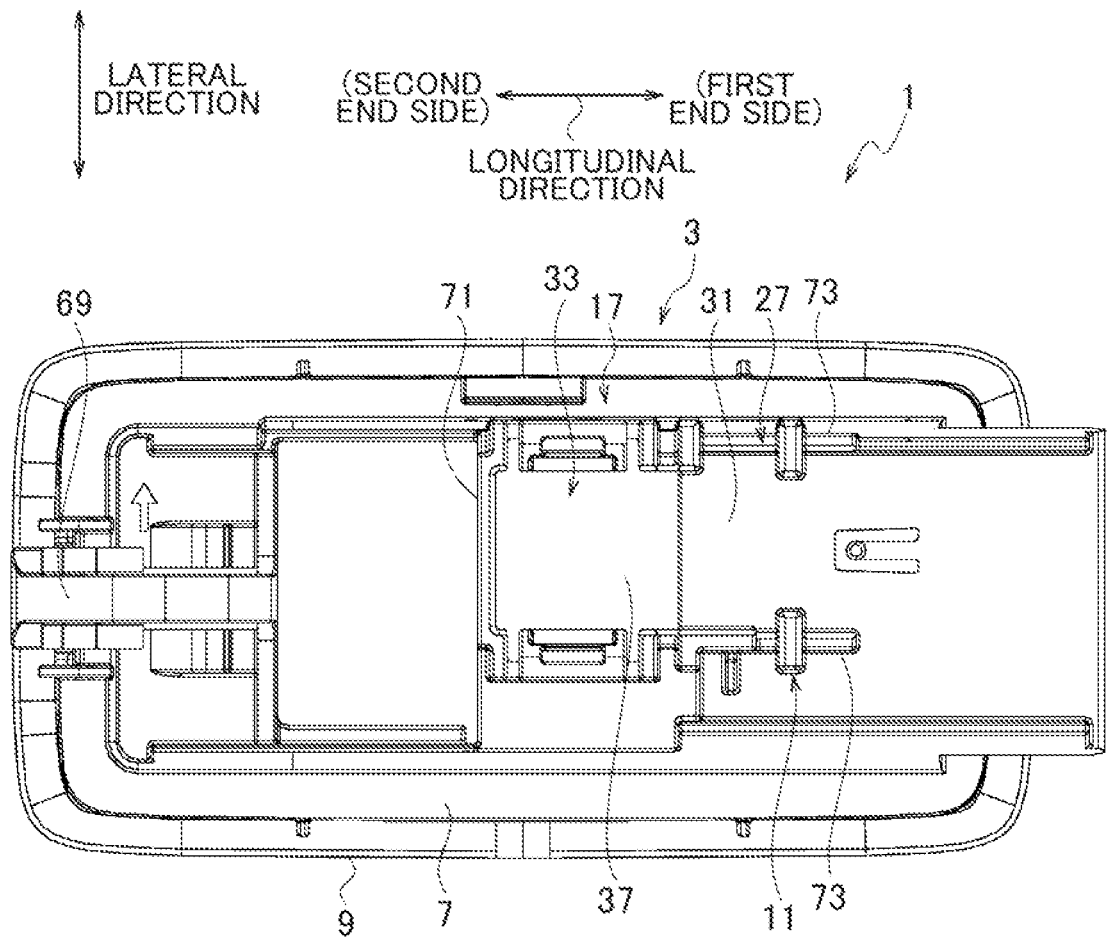
FIG. 5A is a VA arrow view in FIG. 2.
Figure 5B:
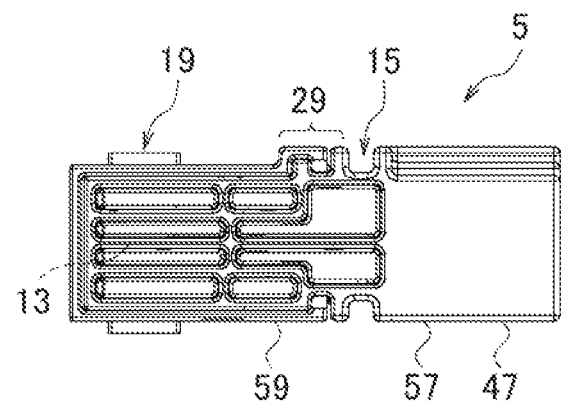
FIG. 5B is a VB arrow view in FIG. 2.
Figure 7:
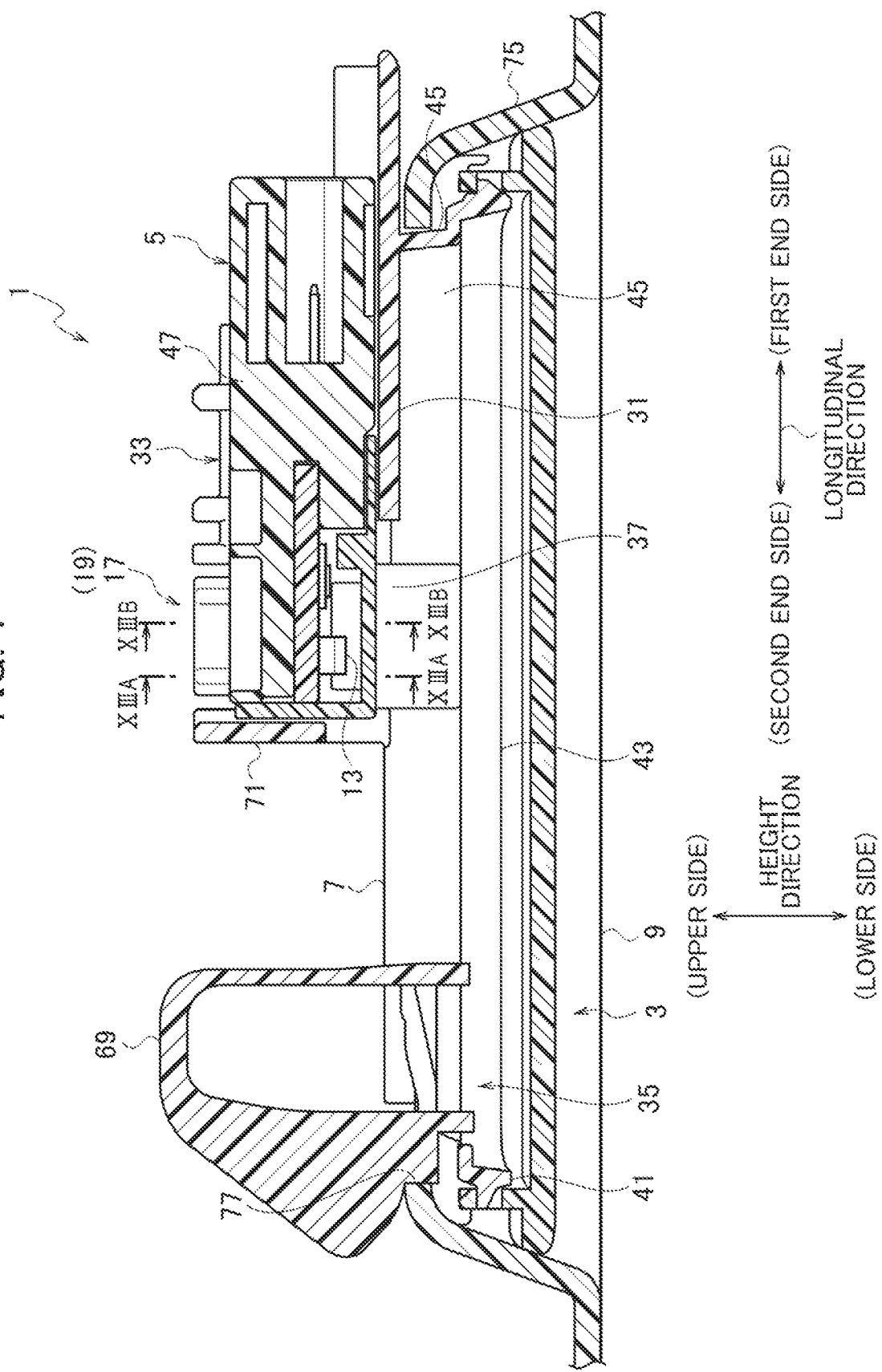
FIG. 7 is a cross-sectional view taken along the line VII-VII of FIG. 1.
Figure 8:
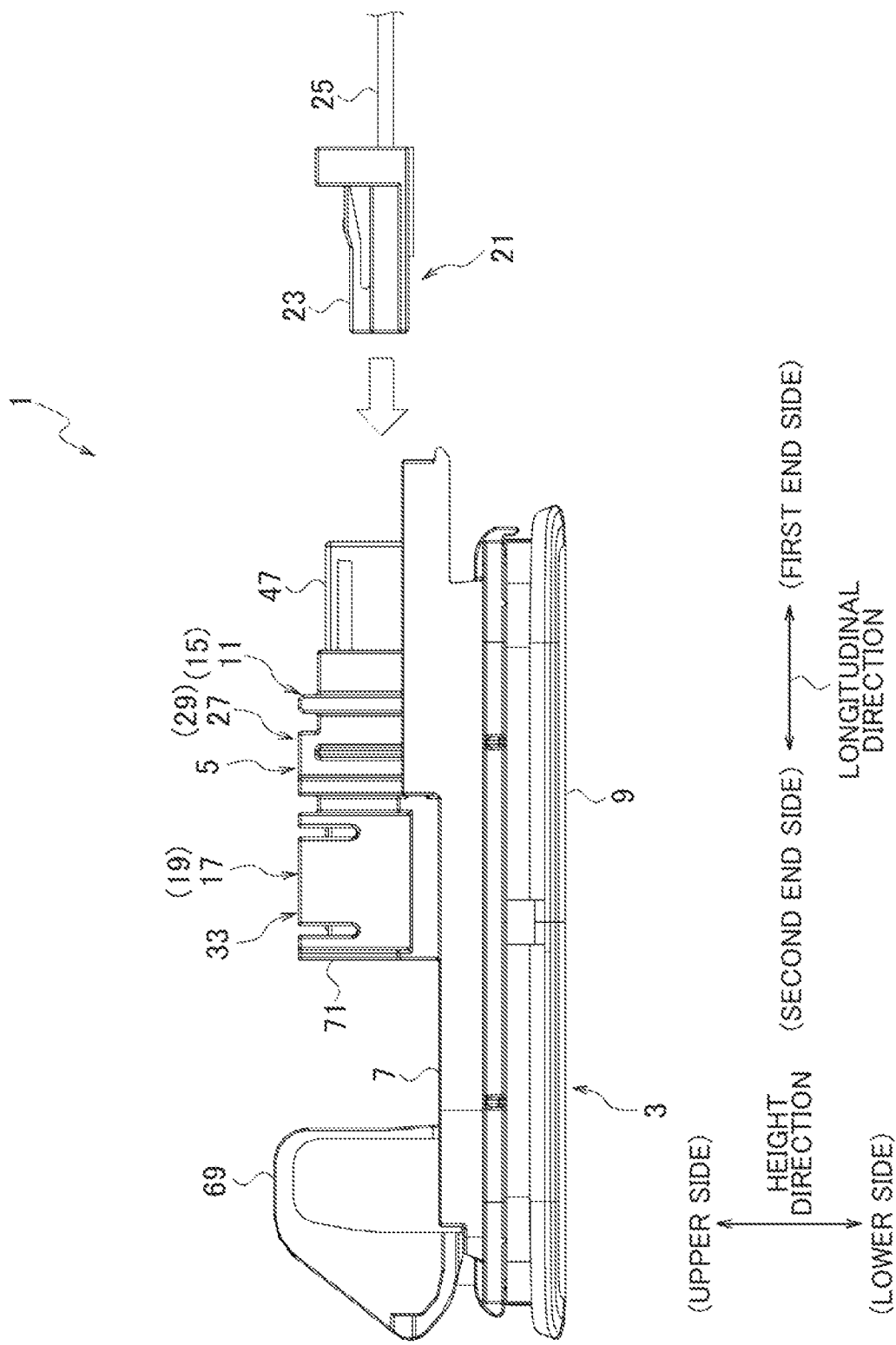
FIG. 8 is a VIII arrow view in FIG. 1, and illustrates a state before the connector is installed.
Figure 14:
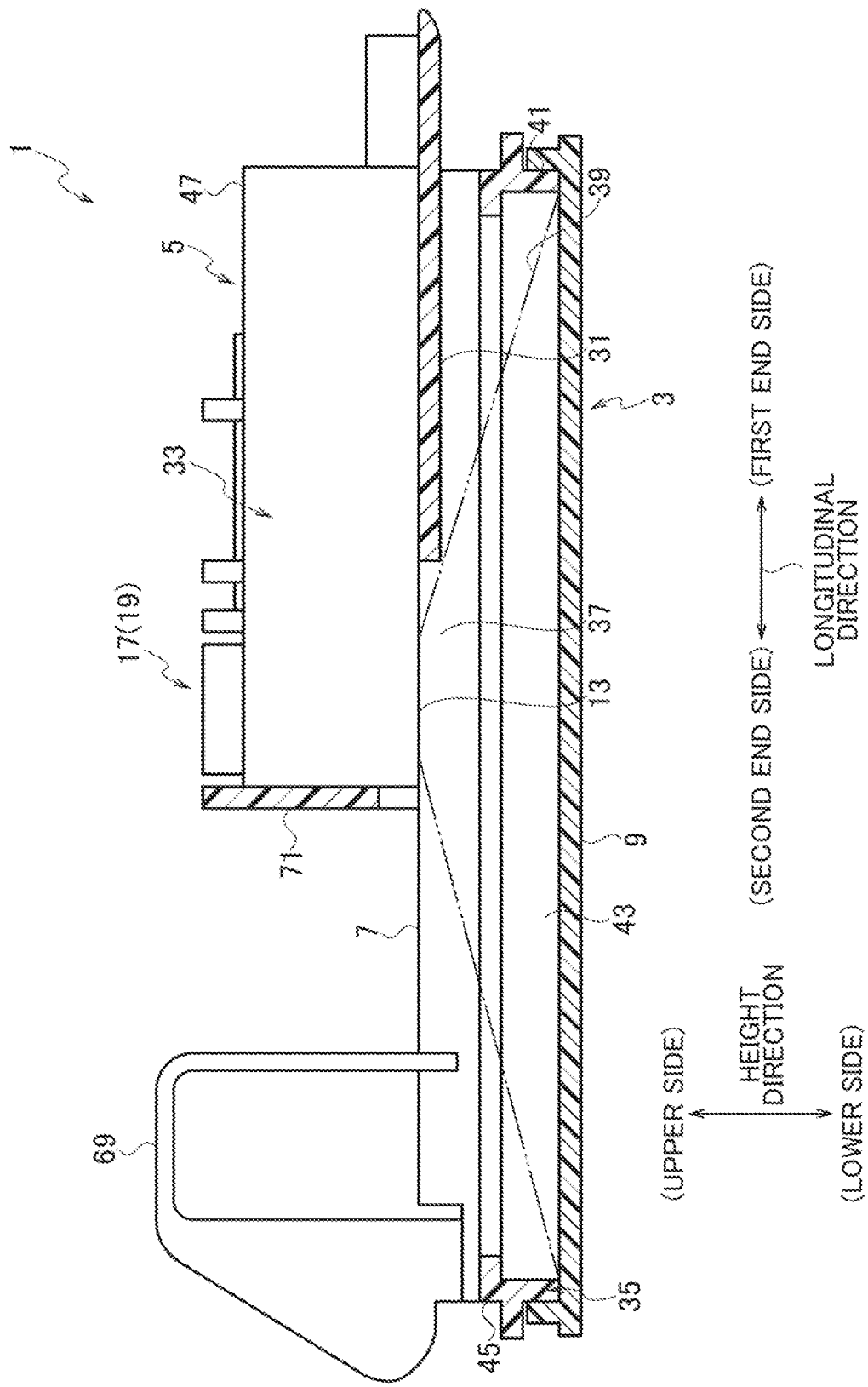
FIG. 14 is a diagram corresponding to FIG. 7, and is a slightly simplified view of the illumination lamp according to the embodiment of the present invention.

The frame-shaped body 7 is provided with a contact portion (stopper portion) 31 as illustrated in FIGS. 5A, 7, 14, and the like. The contact portion 31 comes into contact with the function portion 5 when the function portion 5 is installed in the frame-shaped body 7, so that the function portion 5 is positioned with respect to the frame-shaped body 7 in the height direction, which is the movement direction of the function portion 5 with respect to the frame-shaped body 7.

That is, in a state where the function portion 5 is installed in the frame-shaped body 7, the function portion 5 (function portion main body 47) comes into contact with the contact portion 31, and the locked portion 19 is locked to the locking portion 17. As a result, the function portion 5 is sandwiched in the height direction by the locking portion 17 of the frame-shaped body 7 and the contact portion 31 of the frame-shaped body 7, so that the function portion 5 is locked to the frame-shaped body 7. Further, the contact portion 31 is separated from the locking portion 17 and the locked portion 19 and the light emitting portion 13, in a predetermined direction (longitudinal direction) orthogonal to the direction (height direction) in which the function portion 5 is sandwiched by the locking portion 17 of the frame-shaped body 7 and the contact portion 31 of the frame-shaped body 7. In the lateral direction, the locking portion 17 of the frame-shaped body 7, the locked portion 19 of the function portion 5, and the contact portion 31 of the frame-shaped body 7 are located at substantially the same positions as the light emitting portion 13 of the function portion 5. The height direction is a direction that is orthogonal to the movement direction of the function portion 5 when the function portion 5 is installed in the frame-shaped body 7 and the extension direction of the predetermined axis along which the change in the posture of the function portion 5 with respect to the frame-shaped body 7 is regulated.

Moreover, when the function portion 5 is installed in the frame-shaped body 7, a bottom surface of the function portion 5 comes into contact with the contact portion 31, and the locked portion 19 of the function portion 5 comes into contact with the locking portion 17 of the frame-shaped body 7. As a result, the function portion 5 is positioned with respect to the frame-shaped body 7 in the height direction.

In a state where the function portion 5 is installed in the frame-shaped body 7, as illustrated in FIG. 14, the contact portion 31, the first guide portion 11, the second guide portion 27, and the light emitting portion 13 to be a portion of the function portion 5 emitting light are separated from each other in a longitudinal direction. That is, in the state where the function portion 5 is installed, in the frame-shaped body 7, the light emitting portion 13 is located in the vicinity of the locking portion 17 and the locked portion 19, and the first guide portion 11 and the first guided portion 15 are separated from the light emitting portion 13 and the locking portion 17 and the locked portion 19 in a longitudinal direction. The light emitting portion 13 uses, for example, an LED as a light source. The longitudinal direction is a direction orthogonal to the height direction, which is the movement direction of the function portion 5 when the function portion 5 is installed in the frame-shaped body 7, and the lateral direction.

As illustrated in FIGS. 5A and 14, the locked portion 19 of the function portion 5 and the locking portion 17 of the frame-shaped body 7, and the contact portion 31 of the frame-shaped body 7 deviate from each other in the longitudinal direction. As a result, after positioning of the function portion 5 with respect to the frame-shaped body 7 in the height direction by the contact portion 31 and the locked portion 19 and the locking portion 17, a rotational moment may be generated in the function portion 5. However, the rotational moment can be received by the first guide portion 11 and the second guide portion 27 of the frame-shaped body 7, and the first guided portion 15 and the second guided portion 29 of the function portion 5.

As illustrated in FIG. 2 and the like, a function portion installation portion 33 in which the function portion 5 is installed is provided on the side of a first end (upper side) which is one side in the height direction of the frame-shaped body 7. A lens installation portion 35 in which the lens 9 is installed is provided on the side of a second end (lower side) which is the other side in the height direction of the frame-shaped body 7.

As illustrated in FIGS. 5A, 11, 14, and the like, the frame-shaped body 7 is provided with a through-hole 37 formed due to the absence of the contact portion 31. In a state where the function portion 5 is installed in the function portion installation portion 33 of the frame-shaped body 7 and the lens 9 is installed in the lens installation portion 35, as illustrated in FIGS. 11, 14, and the like, the light emitting portion 13 of the function portion 5 emits light 39 downward. Then, the light 39 emitted by the light emitting portion 13 reaches the lens 9 through the through-hole 37.

As illustrated in FIGS. 7, 11, and the like, a lower end 41 of the frame-shaped body 7 is formed in a short cylindrical shape (annular shape). As a result, an opening 43 is formed in the lower end 41 of the frame-shaped body 7. The lens 9 is installed in the lens installation portion 35 of the frame-shaped body 7 so as to completely close the opening 43 of the lower end 41 of the frame-shaped body 7.

The light emitting portion 13 of the function portion 5 emits light in a state where the function portion 5 is installed in the function portion installation portion 33 of the frame-shaped body 7 and the lens 9 is installed in the lens installation portion 35 of the frame-shaped body 7. As a result, the light that has passed through the through-hole 37 of the frame-shaped body 7 reaches the opening 43 of the frame-shaped body 7, an entire region of the lens 9 closing the opening 43, or almost the entire region of the lens 9 other than a slight edge.

The frame-shaped body 7 is configured to include a frame-shaped body main body 45 and the locking portion 17, and the function portion 5 is configured to include a function portion main body 47 and the locked portion 19. When the function portion 5 is installed in the frame-shaped body 7, the locked portion 19 is locked to the locking portion 17, so that the function portion 5 is locked to the frame-shaped body 7 as described above.

The locked portion 19 of the function portion 5 is formed of a protrusion 49 protruding from the function portion main body 47.

As illustrated in FIGS. 11, 13A, and the like, the locking portion 17 of the frame-shaped body 7 is configured to include a first protruding portion 51, a second protruding portion 53, and a third protruding portion 55. The first protruding portion 51 is formed in a cantilever shape from the frame-shaped body main body 45 and protrudes upward, for example, and has elasticity.

The second protruding portion 53 is formed in a cantilever shape from, for example, a tip (upper end in the height direction) of the first protruding portion 51, and protrudes by a protrusion length shorter than that of the first protruding portion 51, in a direction different from that of the first protruding portion 51 (for example, in the lateral direction). Although the second protruding portion 53 also has slight elasticity, the protrusion length of the second protruding portion 53 is considerably shorter than the protrusion length of the first protruding portion 51, so that the second protruding portion 53 behaves almost like a rigid body.

The third protruding portion 55 is formed in a cantilever shape from, for example, a tip of the second protruding portion 53, and protrudes by a protrusion length shorter than that of the first protruding portion 51 and longer than that of the second protruding portion 53, in a direction toward a base end (lower side in the height direction) of the first protruding portion 51, so that the third protruding portion 55 has elasticity. The longitudinal direction to be a protrusion direction of the first protruding portion 51 and the longitudinal direction to be a protrusion direction of the third protruding portion 55 are matched with each other. Although the third protruding portion 55 also has elasticity, the protrusion length of the third protruding portion 55 is shorter than the protrusion length of the first protruding portion 51, so that the third protruding portion 55 is slightly less likely to be elastically deformed than the first protruding portion 51.

In addition, when the function portion 5 is installed in the frame-shaped body 7, the tip (the lower end or bottom surface) of the third protruding portion 55 contacts the protrusion 49 (the upper end or the top surface of the protrusion 49) of the locked portion 19.

Moreover, while the function portion 5 is moved in a downward direction (to the lower side in the height direction) with respect to the frame-shaped body 7 and the function portion 5 is installed in the frame-shaped body 7, the protrusion 49 of the function portion 5 sequentially comes into contact with a base end (upper end) and an intermediate portion in the protrusion direction of the third protruding portion 55. Then, the first protruding portion 51 and the third protruding portion 55 are elastically deformed in such a manner that a beam is bent.

When the function portion 5 is installed in the frame-shaped body 7, the protrusion 49 of the function portion 5 gets over the third protruding portion 55, the first protruding portion 51 and the third protruding portion 55 are restored, and the protrusion 49 of the function portion 5 comes into contact with the tip (lower end) in the protrusion direction of the third protruding portion 55. As a result, the upward movement of the function portion 5 with respect to the frame-shaped body 7 is prevented. That is, the function portion 5 is prevented from being separated from the frame-shaped body 7.

After the function portion 5 is installed in the frame-shaped body 7, if a force for moving the function portion 5 in the upward direction (to the upper side in the height direction) (a force for pulling the function portion 5 from the frame-shaped body 7) is applied to the function portion 5, tensile stress is generated in the first protruding portion 51 in the protrusion direction (longitudinal direction). Further, after the function portion 5 is installed in the frame-shaped body 7, if the three for moving the function portion 5 in the upward direction is applied to the function portion 5, compressive stress is generated in the third protruding portion 55 in the longitudinal direction. As a result, buckling does not actually occur in the third protruding portion 55, but a bending moment is generated in the third protruding portion 55 in such a manner that the buckling occurs, and it is difficult for the function portion 5 to be separated from the frame-shaped body 7.

The illumination lamp 1 will be described in more detail.

Figure 4:
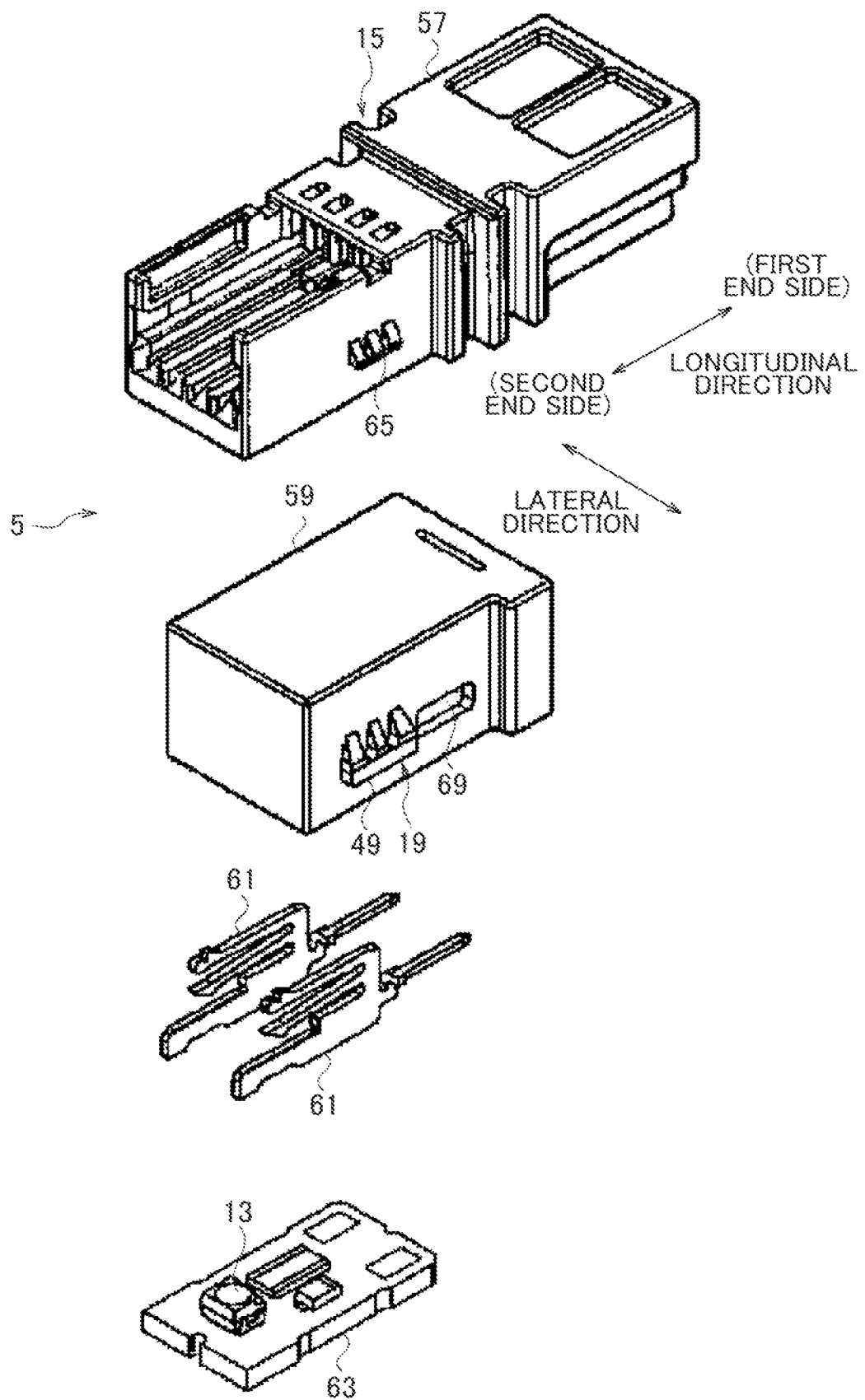
FIG. 4 is an exploded perspective view of the function portion of the illumination lamp according to the embodiment of the present invention.

As illustrated in FIG. 4, the function portion 5 is configured to include a housing 57, a cover 59, a bus bar 61, and a circuit board 63. The cover 59, the bus bar 61, and the circuit board 63 are integrally installed in the housing 57 to form the function portion 5. An outer shape of the function portion 5 is generally a rectangular parallelepiped shape.

The function portion main body 47 is configured to include the housing 57 and the cover 59. The housing 57 is integrally molded with, for example, a synthetic resin. The cover 59 is also integrally molded with, for example, a synthetic resin. The connector main body 23 of the connector 21 is installed in a first end, which is one end in the longitudinal direction of the housing 57.

The cover 59 covers the housing 57 on the side of a second end, which is the other end in the longitudinal direction of the housing 57. Moreover, the cover 59 is installed in the housing 57, so that a lower end in the height direction, both ends in the lateral direction, and the second end in the longitudinal direction of the housing 57 are covered. A protrusion 65 indicated by reference numeral 65 in FIG. 4 and the like is a locking portion provided in the housing 57, and a through-hole 67 indicated by reference numeral 67 is a locked portion provided in the cover 59. Further, the cover 59 is made of a transparent or translucent material that transmits the light emitted by the light emitting portion 13.

The protrusion 65 is provided as a pair, and the through-hole 67 is also provided as a pair. In a state where the cover 59 is installed in the housing 57, as illustrated in FIG. 2 and the like, a pair of protrusions 65 are, fitted into a pair of through-holes 67, respectively, and the housing 57, the cover 59, the bus bar 61, and the circuit board 63 are integrated.

The light emitting portion 13 is provided on the circuit board 63, and is arranged in the second end of the function portion 5 in the longitudinal direction, arranged in the center of the function portion 5 in the lateral direction, and arranged in the lower end of the function portion 5 in the height direction. The light emitting portion 13 emits light downward from the function portion 5.

The locked portion 19 (protrusion 49) is provided as a pair in the cover 59, and is arranged on the side of the second end of the function portion 5 (cover 59) in the longitudinal direction, arranged in both ends of the function portion 5 (cover 593 in the lateral direction, and arranged substantially in the center of the function portion 5 in the height direction.

As illustrated in FIG. 58 and the like, the first guided portion 15 is formed of a recessed portion with a rectangular parallelepiped shape elongated in the height direction, and is provided as a pair in the housing 57. The first guided portion 15 is arranged in an intermediate portion (intermediate portion on the side of the first end) of the function portion 5 (housing 57) in the longitudinal direction. Further, the first guided portion 15 is arranged in a recessed manner toward the center of the housing 57 at both ends of the function portion 5 (housing 57) in the lateral direction, and penetrates the function portion 5 (housing 57) in the height direction.

As illustrated in FIG. SB and the like, the second guided portion 29 is formed of a protrusion with a rectangular parallelepiped shape elongated in the height direction, in a part of the housing 57 and a part of the cover 59. The part of the housing 57 and the part of the cover 59 are engaged with each other by contacting each other. The second guided portion 29 is arranged in the intermediate portion (intermediate portion on the side of the second end) of the function portion 5 in the longitudinal direction. The second guided portion 29 is adjacent to the first guided portion 15, and the first guided portion 15 and the second guided portion 29 are arranged in this order in a direction from the first end side to the second end side in the longitudinal direction.

The second guided portion 29 is arranged so as to protrude from the housing 57 and the cover 59 at one end of the function portion 5 (the housing 57 and the cover 59) in the lateral direction, and extends over the entire length of the function portion 5 (the housing 57 and the cover 59) in the height direction. Note that the second guided portion 29 may be provided at both ends in the lateral direction of the function portion 5.

As illustrated in FIGS. 3, 5A, 7, and the like, the frame-shaped body 7 is configured to include a rectangular annular frame-shaped body main body 45 having a small height dimension value, a rectangular annular lower end 41 having a small height dimension value, a function portion installation portion 33, and a snap-fit 69.

The values of the longitudinal and lateral dimensions of the frame-shaped body main body 45 are smaller than the values of the longitudinal and lateral dimensions of the lower end 41. In the height direction, the frame-shaped body main body 45 is arranged above the lower end 41. Further, when viewed in the height direction, the frame-shaped body main body 45 is located inside the lower end 41.

As illustrated in FIGS. 5A, 7, and the like, the function portion installation portion 33 is arranged on the side of the first end of the frame-shaped body 7 in the longitudinal direction, arranged in the center portion of the frame-shaped body 7 in the lateral direction, and arranged above the frame-shaped body main body 45 in the height direction. Further, the function portion installation portion 33 is configured to include a rectangular flat plate-shaped first side plate portion 71, a pair of rectangular flat plate-shaped second side plate portions 73, a rectangular flat plate-shaped bottom plate portion (contact portion) 31, and a locking portion 17.

The first side plate portion 71 is arranged so that a thickness direction is the longitudinal direction, and is arranged in the second end of the function portion installation portion 33 in the longitudinal direction. In the height direction, a lower end of the first side plate portion 71 is located slightly above the bottom plate portion 31. Further, in the height direction, the first side plate portion 71 extends upward from the lower end by a predetermined height. Further, a width direction of the first side plate portion 71 is the lateral direction.

The locking portion 17 is provided as a pair, the thickness direction of each of the first protruding portion 51 and the third protruding portion 55 is the lateral direction, and the width direction of each of the first protruding portion 51 and the third protruding portion 55 is the longitudinal direction. The first locking portion 17 of a pair of locking portions is arranged slightly apart from the first side plate portion 71 to the side of the first end in the longitudinal direction, and is arranged in the first end of the first side plate portion 71 in the lateral direction. The second locking portion 17 of the pair of locking portions is arranged slightly apart from the first side plate portion 71 to the side of the first end in the longitudinal direction, and is arranged in the second end of the first side plate portion 71 in the lateral direction.

When the function portion 5 is installed in the function portion installation portion 33, as described above, the pair of locking portions 17 are elastically deformed so as to be separated from each other in the lateral direction.

The second side plate portion 73 is arranged so that the thickness direction is the lateral direction, and is arranged slightly apart from the locking portion 17 to the side of the first end in the longitudinal direction. In the height direction, the second side plate portion 73 extends upward from the bottom plate portion 31, like the first side plate portion 71.

The first second side plate portion 73 of the pair of second side plate portions 73 is arranged in the first end of the first side plate portion 71 in the lateral direction. The second second side plate portion 73 of the pair of second side plate portions 73 is arranged in the second end of the first side plate portion 71 in the lateral direction.

A space of a roughly rectangular parallelepiped shape is formed inside the first side plate portion 71, the second side plate portion 73, the locking portion 17, and the bottom plate portion 31, and the function portion 5 is installed in the space. Further, as illustrated in FIG. 5A and the like, the second end of the contact portion 31 in the longitudinal direction is separated from the first side plate portion 71 and the locking portion 17, so that the through-hole 37 through which the light emitted by the light emitting portion 13 passes is formed between the first side plate portion 71 and the bottom plate portion 31.

As illustrated in FIGS. 3, 5A, and the like, the first guide portion 11 of the frame-shaped body 7 is formed of a protrusion with a rectangular parallelepiped shape elongated in the height direction, and is provided as a pair in the function portion installation portion 33. That is, the first protrusion of the pair of protrusions of the first guide portions 11 is provided in the first second side plate portion 73 of the pair of second side plate portions 73. The first protrusion is arranged in the intermediate portion of the first second side plate portion 73 in the longitudinal direction. In the lateral direction, the first protrusion protrudes from the first second side plate portion 73 of the pair of second side plate portions 73 to the second second side plate portion 73 of the pair of second side plate portions 73.

The second protrusion of the pair of protrusions of the first guide portions 11 is provided in the second second side plate portion 73 of the pair of second side plate portions 73. The second protrusion is arranged in the intermediate portion of the second second side plate portion 73 in the longitudinal direction. In the lateral direction, the second protrusion protrudes from the second second side plate portion 73 of the pair of second side plate portions 73 to the first second side plate portion 73 of the pair of second side plate portions 73.

In a state where the function portion 5 is installed in the function portion installation portion 33, as illustrated in FIGS. 1, 6, and the like, the pair of protrusions of the first guide portions 11 are fitted into the pair of recessed portions of the first guided portions 15, respectively.

As illustrated in FIGS. 3, 5A, and the like, the second guide portion 27 is formed of a recessed portion with a rectangular parallelepiped shape elongated in the height direction, and the second guide portion 27 is provided in the first second side plate portion 73 of the pair of second side plate portions 73. The second guide portion 27 is arranged in the intermediate portion (intermediate portion on the side of the first end) of the function portion installation portion 33 in the longitudinal direction. Moreover, the second guide portion 27 is adjacent to the first guide portion 11, and the first guide portion 11 and the second guide portion 27 are arranged in this order in a direction from the first end side to the second end side in the longitudinal direction. The second guide portion 27 is provided in the vicinity of the first guide portion 11, and is longitudinally separated from the locking portion 17, the locked portion 19, and the light emitting portion 13.

In a state where the function portion 5 is installed in the function portion installation portion 33, as illustrated in FIGS. 1, 6, and the like, the protrusion of the second guided portion 29 is fitted into the recessed portion of the second guide portion 27. When the second guided portions 29 are provided in both ends in the lateral direction of the function portion 5, the second guide portions 27 are also provided as a pair, and the pair of protrusions of the second guided portions 29 are fitted into the pair of recessed portions of the second guide portions 27, respectively.

Next, a procedure for assembling the illumination lamp 1 will be illustrated.

From the state illustrated in FIG. 4, the function portion 5 is assembled by appropriately installing the circuit board 63, the bus bar 61, and the cover 59 in the housing 57.

Subsequently, the function portion 5 is installed in the frame-shaped body 7, and the lens 9 is installed.

The installation of the illumination lamp 1 in a through-hole 77 in a panel (for example, a ceiling panel) 75 of a vehicle will be described.

In an initial state, it is assumed that the illumination lamp 1 is arranged below the ceiling panel 75, the function portion 5 is located on the upper side, and the lens 9 is located on the lower side. In the initial state, it is assumed that the first end of the lamp 1 in the longitudinal direction is located slightly above the second end. In the initial state, it is assumed that the wiring 25 of the connector 21 extends above the ceiling panel 75 and extends slightly below the ceiling panel 75 through the through-hole 77. Further, in the initial state, it is assumed that the connector main body 23 is provided at the end of the wiring 25 extending below the ceiling panel 75.

In the above initial state, the connector main body 23 (connector 21) is installed in the function portion 5. Subsequently, the first end of the illumination lamp 1 (frame-shaped body 7) in the longitudinal direction is semi-engaged (temporarily engaged) with an edge of the through-hole 77 of the ceiling panel 75 on the side of a first end side in the longitudinal direction.

Subsequently, the illumination lamp 1 is rotated around the semi-engaged portion of the illumination lamp 1 so that the side of the second end in the longitudinal direction of the illumination lamp 1 moves upward. By the rotation, the snap-fit 69 comes into contact with an edge of the through-hole 77 of the ceiling panel 75 on the side of a second end in the longitudinal direction and is elastically deformed.

When the illumination lamp 1 is further rotated, the snap-fit 69 is disengaged from the edge of the through-hole 77 of the ceiling panel 75, and as illustrated in FIG. 7 and the like, the snap-fit 69 is restored, and the installation of the illumination lamp 1 in the panel 75 of the vehicle is completed.

In a state where the installation is completed, the light emitting portion 13 emits light by sending electric power or the like via the wiring 25. Then, the light emitted by the light emitting portion 13 passes through the lens 9 and reaches the interior of the vehicle to illuminate the interior.

In the illumination lamp 1, the frame-shaped body 7 is provided with the first guide portion 11, and the function portion 5 is provided with the first guided portion 15. Then, when the function portion 5 is installed in the frame-shaped body 7, the first guided portion 15 is engaged with the first guide portion 11, so that the function portion 5 is installed in the frame-shaped body 7. Further, in the state where the function portion 5 is installed in the frame-shaped body 7, the first guided portion 15 is engaged with the first guide portion 11, so that a change in the posture of the function portion 5 with respect to the frame-shaped body 7 is regulated around the axis extending in the lateral direction.

With this configuration, the function portion 5 is firmly held in the frame-shaped body 7, and even when a moment of the unexpected magnitude is applied to the function portion 5, it is possible to prevent the function portion 5 from being separated from the design portion 3.

Figure 15:
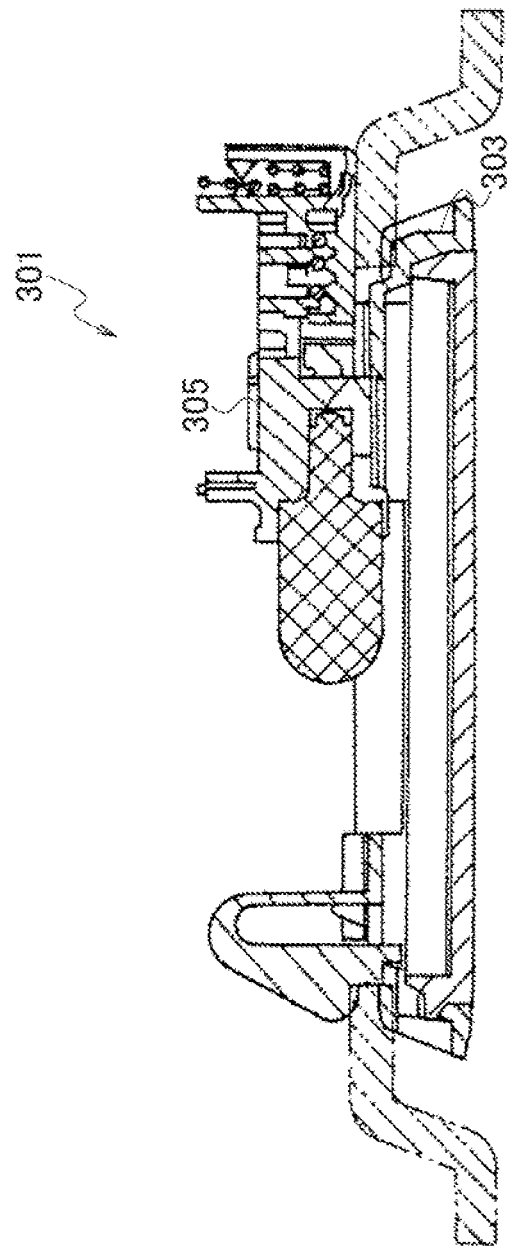
FIG. 15 is a diagram illustrating an illumination lamp according to a comparative example.
Figure 16:
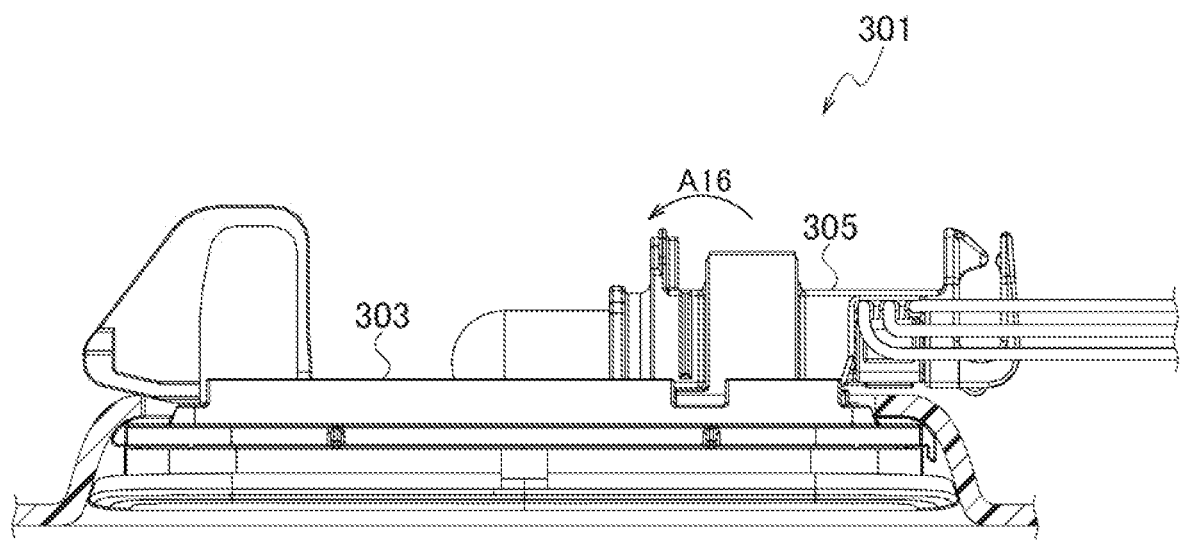
FIG. 16 is a diagram illustrating an illumination lamp according to a comparative example.

On the other hand, an illumination lamp 301 according to a comparative example does not include the guide portion 11 and the guided portion 15, unlike the illumination lamp 1 of the present application, as illustrated in FIG. 15. That is, in the illumination lamp 301 according to the comparative example, the locked portion of the function portion 305 is only locked to the locking portion of the frame-shaped body 303 in a state where the function portion 305 is installed in the frame-shaped body 303. Therefore, in the illumination lamp 301 according to the comparative example, as illustrated in FIG. 16, when a moment of the unexpected magnitude (see an arrow A16) is applied to the function portion 305, the function portion 305 may be separated from the frame-shaped body 303.

In the illumination lamp 1, when the function portion 5 is installed in the frame-shaped body 7, the first guided portion 15 is engaged with the first guide portion 11, so that the function portion 5 moves linearly with respect to the frame-shaped body 7 only in the height direction. Further, in the illumination lamp 1, the first guided portion 15 is engaged with the first guide portion 11, so that a change in the posture of the function portion 5 with respect to the frame-shaped body 7 is regulated around the axis extending in the lateral direction.

With this configuration, even if the wiring 25 extending from the connector 21 installed in the function portion 5 is pulled upward and a rotational moment is generated in the function portion 5, the rotational moment can be firmly received by the function portion 5 and the frame-shaped body 7.

In the illumination lamp 1, in a state where the function portion 5 is installed in the frame-shaped body 7, the second guided portion 29 is engaged with the second guide portion 27, so that a change in the posture of the function portion 5 with respect to the frame-shaped body 7 is regulated around the axis extending in the lateral direction.

With this configuration, even if the wiring 25 extending from the connector 21 installed in the function portion 5 is pulled upward and a rotational moment is generated in the function portion 5, the rotational moment can be more reliably received by the function portion 5 and the frame-shaped body 7.

In the illumination lamp 1, in a state where the function portion 5 is installed in the frame-shaped body 7, the contact portion 31 and the light emitting portion 13 of the function portion 5 are separated from each other in the longitudinal direction, and the through-hole 37 is formed. As a result, the light emitted by the light emitting portion 13 can easily reach the lens 9 without being obstructed by the contact portion 31.

Figure 17:
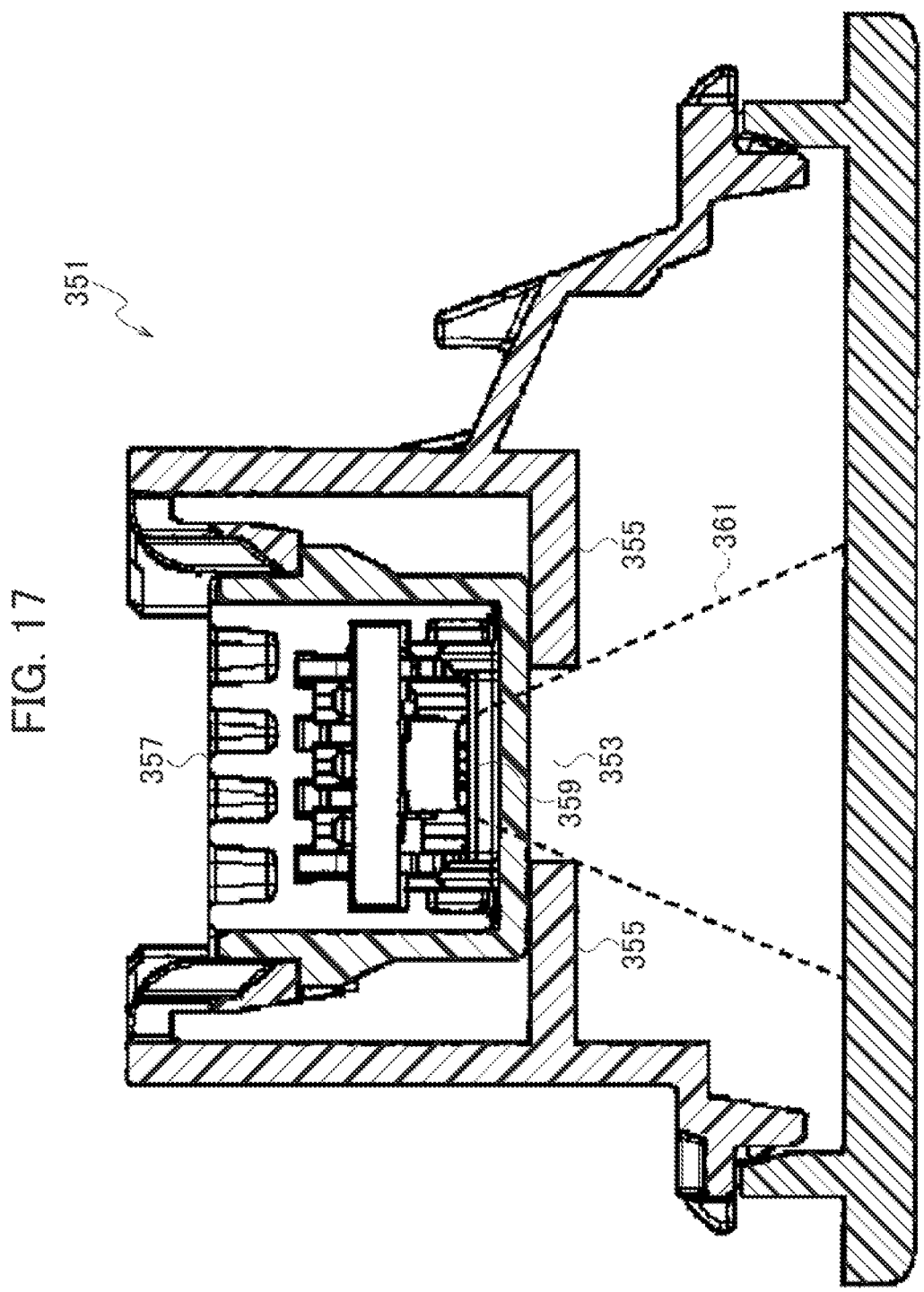
FIG. 17 is a diagram illustrating an illumination lamp according to a comparative example.

On the other hand, in an illumination lamp 351 according to a comparative example, as illustrated in FIG. 17, the guide portion and the guided portion are not provided, so that a contact portion 355 is provided in a light emitting portion 359. Even in the illumination lamp 351 according to the comparative example, a through-hole 353 is formed, but the through-hole 353 cannot be formed to have a sufficiently large size. As a result, the contact portion 355 and the light emitting portion 359 of the function portion 357 interfere with each other, and a part of light 361 emitted by the light emitting portion 359 is obstructed by the contact portion 355.

In the illumination lamp 1 of the present application, in a state where the function portion 5 is installed in the function portion installation portion 33 of the frame-shaped body 7 and the lens 9 is installed in the lens installation portion 35 of the frame-shaped body 7, the light emitting portion 13 of the function portion 5 emits light downward. Then, the light emitted by the light emitting portion 13 reaches the lens 9 through the large through-hole 37. As a result, it is possible to prevent an irradiation area of the light emitting portion 13 from being narrowed. That is, the light emitted by the light emitting portion 13 can easily reach the lens 9 through the through-hole 37 without being obstructed by the contact portion 31.

According to the illumination lamp 1, since the locking portion 17 and the locked portion 19 are configured as described above, it becomes difficult for the function portion 5 installed in the frame-shaped body 7 to be separated from the frame-shaped body 7.

In the illumination lamp 1, as described above, in a state where the function portion 5 is installed in the frame-shaped body 7, the pair of protrusions of the first guide portion 11 are fitted into the pair of recessed portions of the first guided portion 15. As a result, even when a force such as a rotational moment is applied to the function portion 5, for example, a lateral interval between the pair of second side plate portions 73 can be prevented from increasing, and the function portion 5 can be prevented from being separated from the frame-shaped body 7.

Although the present embodiment has been described above, the present embodiment is not limited to these, and various modifications can be made within the scope of the gist of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination lamp comprising:
   a frame-shaped body provided with a first guide portion; and
   a function portion provided with a light emitting portion emitting light and a first guided portion,
   wherein the first guided portion is engaged with the first guide portion in a state where the function portion is installed in the frame-shaped body, so that a change in the posture of the function portion with respect to the frame-shaped body is regulated around at least a predetermined axis;
   wherein the first guided portion is a slot and the first guide portion is a protrusion that protrudes from a plate portion, and the protrusion is slidably received in said slot to be retained by opposite walls defining said slot.

2. The illumination lamp according to claim 1, wherein the frame-shaped body includes a locking portion,
   the function portion includes a locked portion,
   when the function portion is installed in the frame-shaped body, the locked portion is locked to the locking portion,
   the light emitting portion is located in the vicinity of the locking portion and the locked portion, and
   the first guide portion is separated from the light emitting portion.

3. The illumination lamp according to claim 2, wherein the frame-shaped body includes a contact portion,
   when the function portion is installed in the frame-shaped body, the function portion comes into contact with the contact portion and the locked portion is locked to the locking portion, so that the function portion is sandwiched by the locking portion of the frame-shaped body and the contact portion of the frame-shaped body, and the function portion is locked to the frame-shaped body, and the contact portion is separated from the locking portion and the locked portion and the light emitting portion, in a predetermined direction orthogonal to a direction in which the function portion is sandwiched by the locking portion of the frame-shaped body and the contact portion of the frame-shaped body.

4. The illumination lamp according to claim 3, further comprising: a lens integrally installed in the frame-shaped body, wherein
   a function portion installation portion in which the function portion is installed is provided on the side of a first end of the frame-shaped body,
   a lens installation portion in which the lens is installed is provided on the side of a second end of the frame-shaped body,
   a through-hole is formed due to the absence of the contact portion, and
   in a state where the function portion is installed in the function portion installation portion of the frame-shaped body and the lens is installed in the lens installation portion of the frame-shaped body, the light emitting portion of the function portion emits light to the side of the second end, and the light emitted by the light emitting portion of the function portion reaches the lens through the through-hole.

5. The illumination lamp according to claim 2, wherein
   the locked portion is formed of a protrusion protruding from a function portion main body provided in the function portion,
   the locking portion includes a first protruding portion protruding from a frame-shaped body main body provided in the frame-shaped body, a second protruding portion protruding from the first protruding portion in a direction different from a direction of the first protruding portion, and a third protruding portion protruding from the second protruding portion in a direction toward a base end of the first protruding portion, and
   when the function portion is installed in the frame-shaped body, a tip of the third protruding portion contacts the protrusion of the locked portion.

6. The illumination lamp according to claim 1, wherein
   when the function portion is installed in the frame-shaped body, the first guided portion is engaged with the first guide portion, so that the function portion moves linearly with respect to the frame-shaped body, and
   the predetermined axis extends in another predetermined direction orthogonal to a movement direction of the function portion when the function portion is installed in the frame-shaped body.

7. The illumination lamp according to claim 1, further comprising: a connector including a connector main body and a wiring extending from the connector main body, wherein
   the connector main body is installed in the function portion, and
   in a state where the function portion is installed in the frame-shaped body and the connector is installed in the function portion, even if the wiring is pulled in a predetermined direction and a rotational moment is generated in the connector main body and the function portion, a change in the posture of the function portion with respect to the frame-shaped body is regulated around the predetermined axis.

8. The illumination lamp according to claim 1, wherein
   the frame-shaped body is provided with a second guide portion,
   the function portion is provided with a second guided portion, and
   the second guided portion is engaged with the second guide portion in a state where the function portion is installed in the frame-shaped body, so that a change in the posture of the function portion with respect to the frame-shaped body is regulated around the at least predetermined axis.

9. An illumination lamp comprising:
   a frame-shaped body provided with a first guide portion, a second guide portion, a locking portion, a contact portion, and a through-hole formed due to the absence of the contact portion; and
   a function portion provided with a light emitting portion emitting light, a first guided portion, a second guided portion, and a locked portion, wherein
   the first guided portion is engaged with the first guide portion and the second guided portion is engaged with the second guide portion, so that the function portion moves in a height direction with respect to the frame-shaped body and is installed in the frame-shaped body,
   when the function portion is installed in the frame-shaped body, the first guided portion is engaged with the first guide portion and the second guided portion is engaged with the second guide portion, so that a change in the posture of the function portion with respect to the frame-shaped body is regulated around an axis extending in a lateral direction,
   when the function portion is installed in the frame-shaped body, the light emitting portion and the through-hole are located in the vicinity of the locking portion and the locked portion in a longitudinal direction,
   the first guide portion and the first guided portion and the second guide portion and the second guided portion are separated from the locking portion, the locked portion, the light emitting portion, and the through-hole,
   when the function portion is installed in the frame-shaped body, the function portion comes into contact with the contact portion and the locked portion is locked to the locking portion, so that the function portion is sandwiched in the height direction by the locking portion of the frame-shaped body and the contact portion of the frame-shaped body, and the function portion is locked to the frame-shaped body, and
   the light emitted by the light emitting portion passes through the through-hole;
   wherein the first guided portion is a slot and the first guide portion is a protrusion that protrudes from a plate portion, and the protrusion is slidably received in said slot to be retained by opposite walls defining said slot.

* * * * *